US012663552B2

(12) United States Patent (10) Patent No.: US 12,663,552 B2
Ozasa et al. (45) Date of Patent: Jun. 23, 2026

(54) METHOD OF PROCESSING SEISMIC DATA ACQUIRED BY REFLECTION SEISMIC SURVEY

(71) Applicants: IHI Corporation, Tokyo (JP); Hitoshi Mikada, Kyoto (JP)

(72) Inventors: Hiroaki Ozasa, Tokyo (JP); Hitoshi Mikada, Kyoto (JP)

(73) Assignees: IHI Corporation, Tokyo (JP); Hitoshi Mikada, Kyoto (JP)

( * ) Notice: Subject to any disclaimer, the term of this patent is extended or adjusted under 35 U.S.C. 154(b) by 421 days.

(21) Appl. No.: 18/502,427

(22) Filed: Nov. 6, 2023

(65) Prior Publication Data

US 2024/0069231 A1 Feb. 29, 2024

Related U.S. Application Data

(63) Continuation of application No. PCT/JP2022/002213, filed on Jan. 21, 2022.

(30) Foreign Application Priority Data

May 12, 2021 (JP) ................................. 2021-081267

(51) Int. Cl.
*G01V 1/30* (2006.01)
*G01V 1/38* (2006.01)

(52) U.S. Cl.
CPC ............ *G01V 1/305* (2013.01); *G01V 1/3843* (2013.01)

(58) Field of Classification Search
CPC . G01V 1/38; G01V 1/36; G01V 1/305; G01V 1/282; G01V 1/3843; G01V 2210/56; G01V 2210/614; Y02A 90/30
(Continued)

(56) References Cited

U.S. PATENT DOCUMENTS 5,721,710 A * 2/1998 Sallas .................... G01V 1/375
702/14
7,616,523 B1 11/2009 Tabti et al.
(Continued)

FOREIGN PATENT DOCUMENTS

CA 2831858 A1 * 5/2014 ............. G01V 1/364
CN 101876715 A 11/2010
(Continued)

OTHER PUBLICATIONS

International Search Report issued Mar. 29, 2022 in PCT/JP2022/ 002213 filed on Jan. 21, 2022, 3 pages.
(Continued)

*Primary Examiner* — Lynda Jasmin
(74) *Attorney, Agent, or Firm* — Oblon, McClelland, Maier & Neustadt, L.L.P.

(57) ABSTRACT

A method of processing seismic data by a reflection seismic survey includes: calculating a first pseudo-water-surface reflection wave by virtually propagating a direct wave represented in the seismic data in a progressing direction of a time axis by a time in which the acoustic wave propagates in the water at a distance twice a depth of the seismic source, and further correcting an amplitude of the direct wave so that the amplitude is approximated to an amplitude of a water-surface reflection wave of the acoustic wave represented is the seismic data; and subtracting a component corresponding to the first pseudo-water-surface reflection wave from the seismic data.

4 Claims, 9 Drawing Sheets

(58) Field of Classification Search

USPC .......................................................... 702/14

See application file for complete search history.

(56)                    References Cited

U.S. PATENT DOCUMENTS

| | | | | |
|---|---|---|---|---|
| 2008/0008038 A1* | 1/2008 | Robertsson | .......... | G01V 1/3808 |
| | | | | 367/21 |
| 2010/0103772 A1* | 4/2010 | Eick | ..................... | G01V 1/3808 |
| | | | | 367/21 |
| 2011/0058450 A1 | 3/2011 | Van Den Berg et al. | | |
| 2011/0166790 A1 | 7/2011 | Pica | | |
| 2013/0201791 A1 | 8/2013 | Parkes et al. | | |
| 2015/0198730 A1 | 7/2015 | Roberts | | |
| 2015/0331128 A1 | 11/2015 | Mikada et al. | | |
| 2016/0054465 A1 | 2/2016 | Lamont et al. | | |
| 2018/0003840 A1* | 1/2018 | Blanchard | .............. | G01V 1/308 |
| 2025/0012941 A1* | 1/2025 | Hwang | ................ | G01V 1/3852 |

FOREIGN PATENT DOCUMENTS

| | | | | | |
|---|---|---|---|---|---|
| CN | 106291709 A | 1/2017 | | | |
| JP | 8-501395 A | 2/1996 | | | |
| JP | 2014-137320 A | 7/2014 | | | |
| WO | WO-2016083892 A2 * | 6/2016 | .............. | G01V 1/38 |

OTHER PUBLICATIONS

GAZDAG, "Modeling of the acoustic wave equation with transform methods", Geophysics, vol. 46, No. 6, 1981, pp. 854-859.

Ozasa et al., "Survey Performance of Deeply-Towed Marine Seismic Vibrator with Post-Survey Processing Optimized for Deeply-Towed Survey", OTC-30178-MS, Offshore Technology Conference Asia, Oct. 27, 2020, 10 pages, XP093263027.

Stork et al., "Predicting and removing complex 3D surface multiples with Wem modeling—an alternative to 3D SRME for wide azimuth surveys?", Seg/New Orleans 2006 Annual Meeting, 2006, 5 pages, XP093262415.

Ocharova et al., "Deghosting of Seismic Data Based on Adaptive Subtraction Algorithm", 6th Congress of Balkan Geophysical Society, Oct. 2011, 5 pages, XP093261875.

Extended European Search Report issued Apr. 11, 2025 in European Patent Application No. 22807012.4, 9 pages.

Japanese Decision to Grant a Patent issued Dec. 17, 2024 in Japanese Patent Application No. 2023-520768, 3 pages.

* cited by examiner

S10 — GENERATE SEISMIC DATA

S20 — CALCULATE PSEUDO WATER-SURFACE REFLECTION WAVE

S30 — REMOVE COMPONENT OF WATER-SURFACE REFLECTION WAVE

S40 — CALCULATE PSEUDO DIRECT WAVE

S50 — ADD DATA SHOWING PSEUDO DIRECT WAVE TO SEISMIC DATA PROCESSED IN STEP S30

DIRECT WAVE COMPONENT
+
1st to 3rd WATER-SURFACE
REFLECTION WAVE COMPONENTS

DIRECT WAVE COMPONENT

METHOD OF PROCESSING SEISMIC DATA ACQUIRED BY REFLECTION SEISMIC SURVEY

CROSS-REFERENCE TO RELATED APPLICATIONS

The present application is a continuation application of International Application No. PCT/JP2022/002213, now WO 2022/239305 A1, filed on Jan. 21, 2022, which claims priority to Japanese Patent Application No. 2021-081267, filed on May 12, 2021, the entire contents of which are incorporated by reference herein.

BACKGROUND OF THE INVENTION

Technical Field

The present disclosure relates to a method of processing seismic data acquired by reflection seismic survey using a seismic source placed under water.

Background

The reflection seismic survey is known as one of the methods of water-bottom exploration. In this method, a seismic source and a streamer cable are towed by a seismic survey ship and put into the water. The seismic source generates an acoustic wave with a predetermined band. Individual receivers (hydrophones) on the streamer cable receive the acoustic wave output from the seismic source. The received acoustic wave includes the reflection waves of the acoustic wave due to strata below the water bottom. In the reflection seismic survey, physical properties such as the shape and density of the strata can be identified by measuring the arrival time of the reflection waves while intermittently changing the locations of the seismic source and the streamer cable (see JP 2014-137320 A).

SUMMARY OF THE INVENTION

The survey target of the water-bottom exploration is the strata under the water bottom. Therefore, the intensities of the reflection waves from the strata can be higher as the seismic source is closer to the water bottom. However, the acoustic wave propagates in all directions from the seismic source. Thus, the receivers receive not only the reflected acoustic wave directly reaching the strata from the seismic source, but also the reflected wave of the acoustic wave reaching the strata from the seismic source via reflection on a water surface. For convenience, the reflected acoustic wave in the former case is referred to as a direct wave, and the reflected acoustic wave in the latter case is referred to as a water-surface reflection wave. In this case, the same strata unwantedly appear at different depths in the cross-section being the seismic data, thereby a proper evaluation of the strata becomes difficult.

The present disclosure was made in view of these circumstances, and the object thereof is to provide a processing method capable of reducing the influence of water-surface reflection waves on the seismic data acquired by the reflection seismic survey.

A method according to one aspect of the present disclosure is a method of processing seismic data including: calculating a first pseudo-water-surface reflection wave by virtually propagating a direct wave represented in the seismic data in a progressing direction of a time axis by a time in which the acoustic wave propagates in water at a distance twice a depth of a seismic source, and further correcting an amplitude of the direct wave so that the amplitude is approximated to an amplitude of a water-surface reflection wave of the acoustic wave represented in the seismic data; and subtracting a component corresponding to the first pseudo-water-surface reflection wave from the seismic data. Here, the direct wave is an acoustic wave output from the seismic source and reflected on a reflection surface without going through reflection on the water surface; and the first water-surface reflection wave as an acoustic wave which is output from the seismic source and reflected on a water surface and further on the reflection surface, thereby being delayed by a time corresponding to a distance twice the depth of the seismic source.

The method may further include: calculating a first pseudo direct wave by: virtually propagating the first water-surface reflection wave in a direction opposite to the progressing direction of the time axis by the time in which the acoustic wave propagates in the water at the distance twice the depth of the seismic source, and inversing a phase thereof; and adding data showing the first pseudo direct wave to the seismic data in which components corresponding to the first pseudo-water-surface reflection wave are subtracted.

The method may further include: calculating a second pseudo-water-surface reflection wave by virtually propagating the direct wave of the acoustic wave represented in the seismic data in the progressing direction of the time axis by a time in which the acoustic wave propagates in the water at a distance twice a depth of a receiver, and correcting an amplitude of the propagated direct wave so that the amplitude is approximated to an amplitude of a second water-surface reflection wave of the acoustic wave represented in the seismic data; calculating a third pseudo-water-surface reflection wave by virtually propagating the direct wave in the progressing direction of the time axis by the time in which the acoustic wave propagates in the water at the distance twice the depth of the seismic source and twice the depth of the receiver, and correcting an amplitude of the propagated direct wave so that the amplitude is approximated to an amplitude of a third water-surface reflection wave of the acoustic wave represented in the seismic data; and subtracting components of the second and the third pseudo-water-surface reflection waves from the seismic data. Here, the second water-surface reflection wave is an acoustic wave which is output from the seismic source, reflected on the reflection surface, and further reflected on the water surface, thereby being delayed by a time corresponding to a distance twice the depth of the receiver, and the third water-surface reflection wave is an acoustic wave which is output from the seismic source, reflected on the water surface, reflected on the reflection surface, and further reflected on the water surface, thereby being delayed by the time corresponding to the distance twice the depth of the seismic source and a time corresponding to the distance twice the depth of the receiver.

The method may further include: calculating a first pseudo direct wave by: virtually propagating the first water-surface reflection wave in a direction opposite to the progressing direction of the time axis by the time in which the acoustic wave propagates in the water at the distance twice the depth of the seismic source in which the acoustic wave propagates in the water at the distance twice the depth of the seismic source, and inversing a phase thereof; calculating a second pseudo direct wave by: virtually propagating the second water-surface reflection wave in a direction opposite to the progressing direction of the time axis by the time in which the acoustic wave propagates in the water at the distance twice the depth of the receiver, and inversing a phase thereof; calculating a third pseudo direct wave by: virtually propagating the first water-surface reflection wave in a direction opposite to the progressing direction of the time axis by the time in which the acoustic wave propagates in the water at the distance twice the depth of the seismic source and the time in which the acoustic wave propagates in the water at the distance twice the depth of the receiver, and inversing a phase thereof; and adding data representing the first, the second, and the third pseudo direct waves to the seismic data in which components corresponding to the first, the second, and the third pseudo-water-surface reflection wave are subtracted.

According to the present disclosure, it is possible to provide a processing method capable of reducing the influence of the water-surface reflection waves on the seismic data acquired by the reflection seismic survey.

DESCRIPTION OF EMBODIMENTS

First Embodiment

Figure 1:
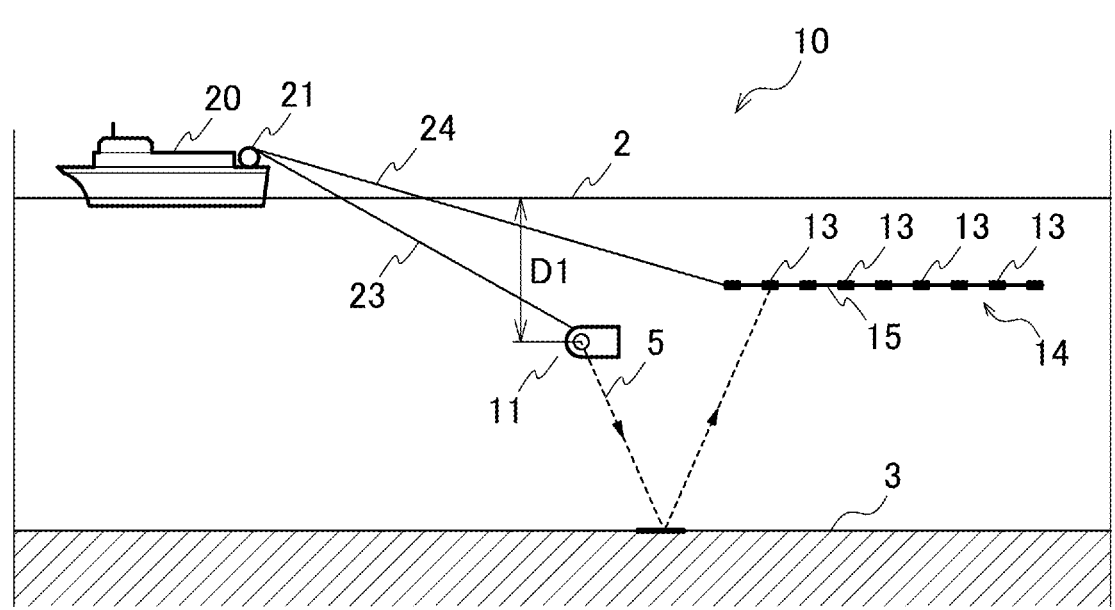
FIG. 1 is a schematic configuration diagram showing an underwater survey system.
Figure 2:
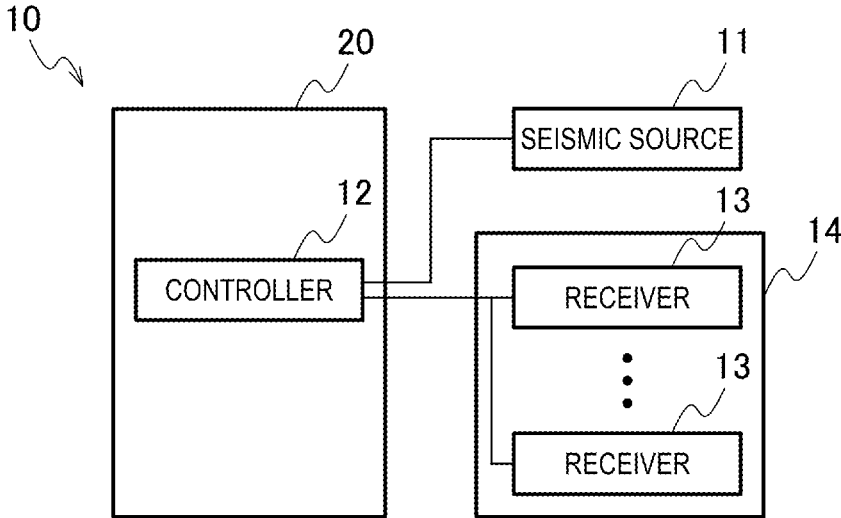
FIG. 2 is a block diagram of the underwater survey system.

A first embodiment of the present disclosure is described below. FIG. 1 is a schematic configuration diagram showing an underwater survey system 10 according to the present embodiment. FIG. 2 is a block diagram of the underwater survey system 10 according to the present embodiment.

As shown in FIGS. 1 and 2, the underwater survey system 10 includes a seismic source 11, a controller 12, and multiple receivers 13. The underwater survey system 10 surveys structures below the water bottom 3 using the reflection seismic survey, method. It is supposed that the underwater survey system 10 according to the present embodiment works on the sea. However, the environment in which the underwater survey system 10 works is not limited to the sea, and it can work in any environment where the water-bottom exploration can be conducted, such as rivers, lakes and so on.

The seismic source 11 is set in water at a depth of D1 and outputs an acoustic wave 5. The seismic source 11 is, for example, a low-frequency generator having a known configuration and includes a vibration plate (not shown) driven by hydraulic pressure. The vibration of the vibration plate is controlled by the controller 12 to generate the acoustic wave 5 of the desired frequency. The vibration plate may be driven by piezoelectric elements or by other known driving mechanisms. The seismic source 11 is not limited to the low-frequency generator as described above but may be an acoustic wave generator such as an air gun or the like.

The multiple receivers 13 are set in the water and arranged in one direction. Each receiver 13 is a so-called hydrophone and receives the acoustic wave 5 in the water. The receivers 13 are connected to each other or held with intervals by members 15 such as cables, thereby constituting a streamer cable 14.

The controller 12 is configured as a so-called computer including a central processing unit (CPU), a storage unit, an auxiliary storage unit, and the like. For example, the controller 12 is installed in a seismic survey ship 20. The controller 12 controls the generation, frequency, and the like of the acoustic wave 5 by the seismic source 11. The generated acoustic wave may be any one of an impulse wave, a sweep wave, and a pseudo-random wave. Otherwise, it may be other acoustic waves having a known waveform. In any cases, the controller 12 records the acoustic wave 5 received by each receiver 13 as signal data.

The seismic survey ship 20 is equipped with a lifting apparatus 21. The lifting apparatus 21 sends out and winds up towlines 23 and 24. The seismic source 11 is connected to an end of the towline 23. The streamer cable 14 is connected to an end of the towline 24. Accordingly, the seismic source 11 and streamer cable 14 are put into or retrieved from the water, depending on the operation of the lifting apparatus 21.

The seismic survey ship 20 tows the seismic source 11 and the streamer cable 14 while the seismic source 11 and the receivers 13 of the streamer cable 14 are operating. The seismic survey ship 20 has, for example, the lifting apparatus 21 that supports the towlines 23 and 24 connected to the seismic source 11 and the receiver 13, respectively, in a state where the towlines 23 and 24 can be unwound and rewound. The equipment in which the underwater survey system 10 is installed is not limited to the seismic survey ship 20, and any equipment may be used as far as it can arrange the seismic source 11 and the streamer cable 14 underwater.

Figure 3:
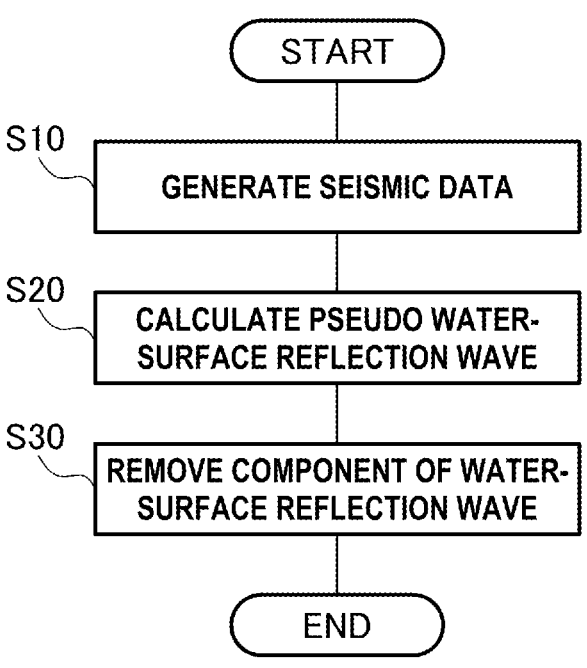
FIG. 3 is a flowchart showing a processing method of the seismic data.
Figure 4:
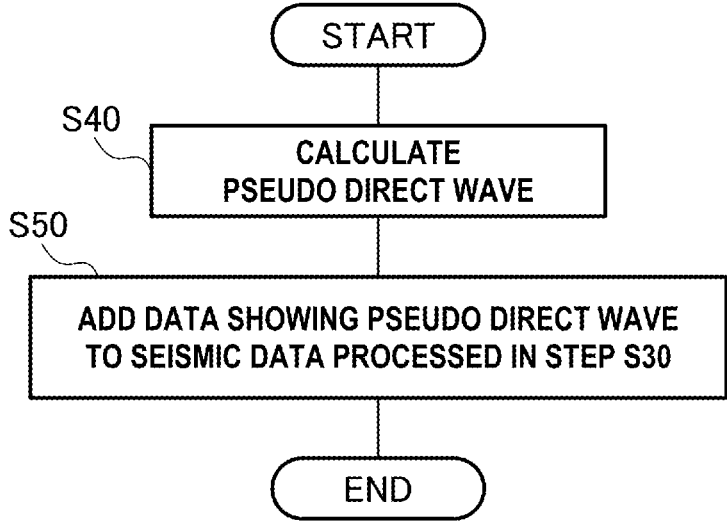
FIG. 4 is a flowchart showing a processing method of the seismic data.
Figures 5A, 5B, 5C:
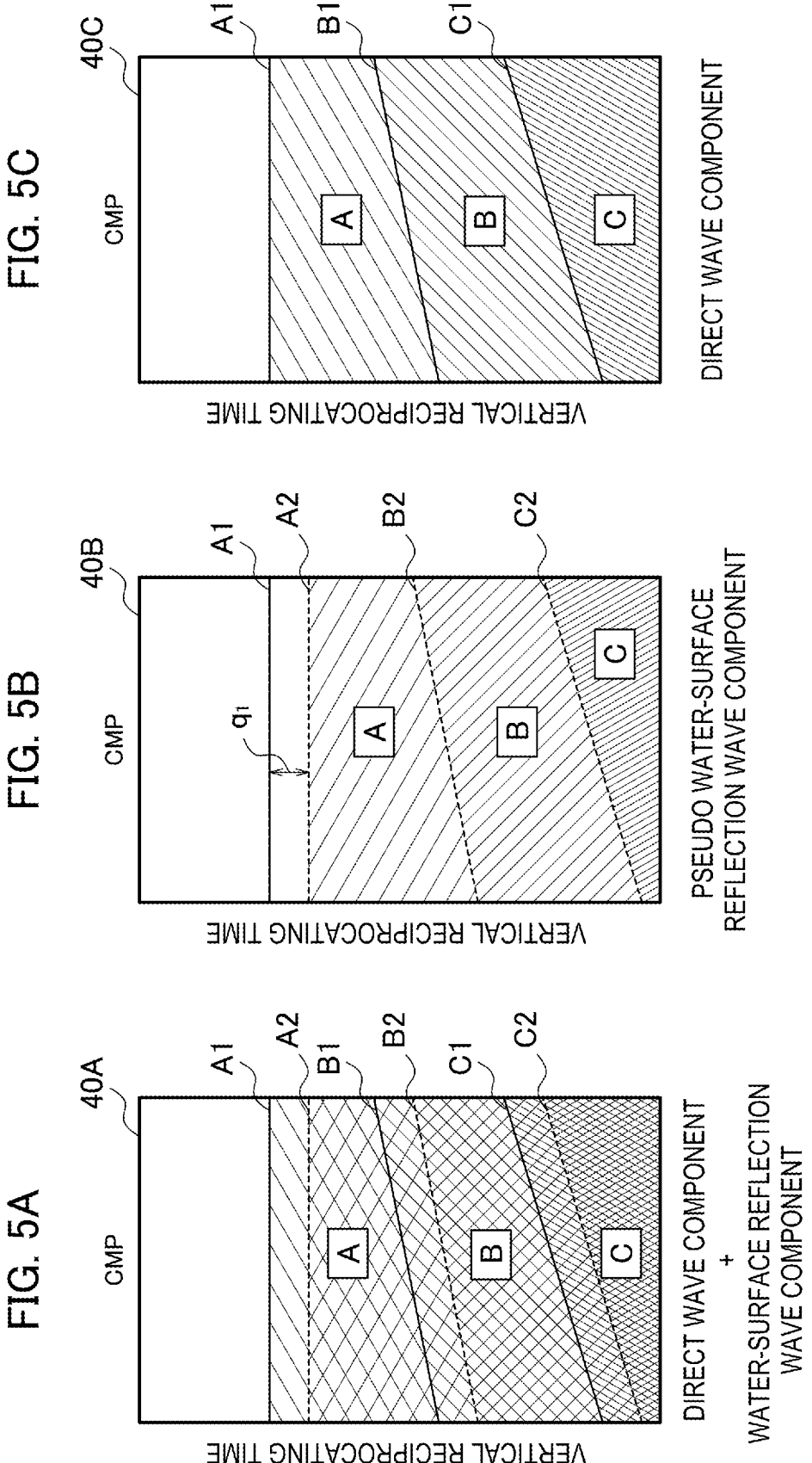
FIGS. 5A, 5B, and 5C are diagrams for explaining an example of cross-sections acquired from seismic data and its processes.
Figure 6A:
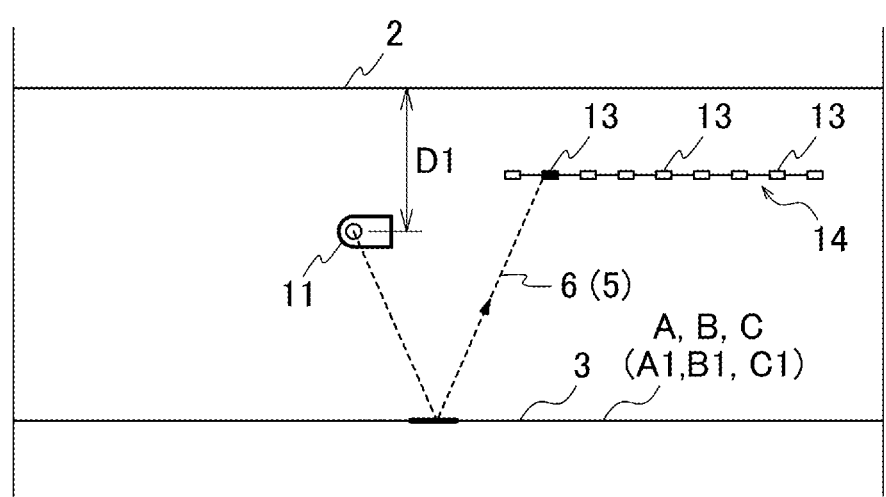
FIGS. 6A and 6B are diagrams for explaining travels of acoustic waves reflected on a reflection surface at the same location.
Figure 6B:
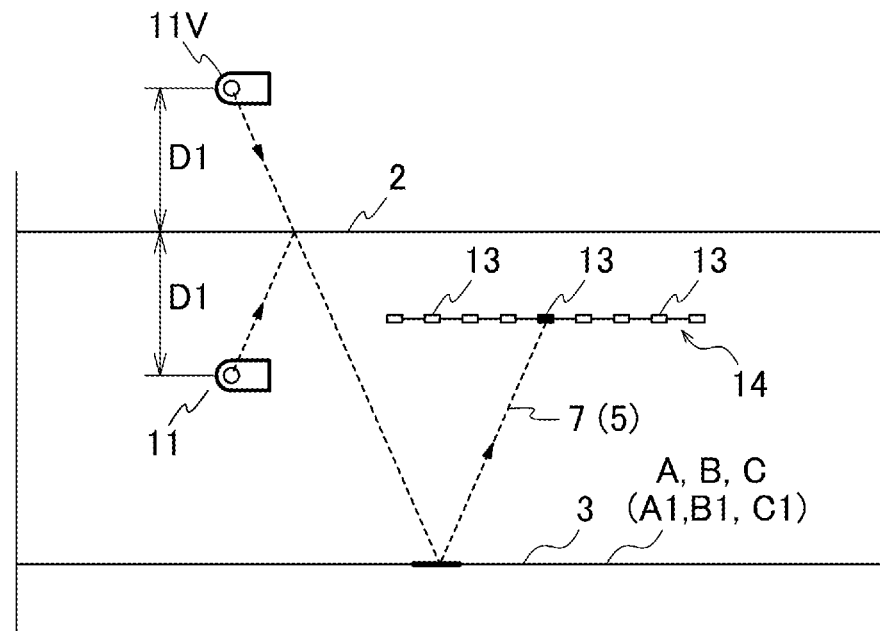

Next, the processing method of seismic data acquired by the underwater survey system 10 will be explained. FIGS. 3 and 4 are flowcharts showing processing methods of the seismic data. FIGS. 5A and 5E are diagrams for explaining an example of cross-sections acquired from the seismic data and its processes. FIGS. 6A and 6B are diagrams showing travels of acoustic waves reflected on a reflection surface at the same location.

First, the seismic data is generated by basic processes in the reflection seismic survey, such as a cross-correlation process, an NMO correction and common midpoint stacking, on the signal data recorded in the controller 12 or the like (step S10). The seismic data represents a cross-section of structures under the water bottom such as a stratum and the like. For the sake of explanation, it is assumed that stratum A, stratum B, and stratum (see FIG. 5C) are confirmed under the water bottom as a reflection surface A1 from the seismic data acquired by the process of step S10. The reflection surface A1 is a boundary surface between the water and the water bottom. A reflection surface against the acoustic wave 5 corresponding to a boundary surface between strata A and B is denoted by B1. A reflection surface against the acoustic wave 5 corresponding to a boundary surface between strata B and C is denoted by C1. That is, the reflection surface means the boundary surface between water and strata (i.e., water bottom) or between two strata with different geology.

FIG. 5A is a cross-section 40A showing structures under the reflection surface A1 (i.e., the water bottom) obtained by the process of step S10. The cross-section 40A depicts the reflection surface A1 being the water bottom and two reflection surfaces B1 and C1 under the water bottom. In addition, the cross-section 40A depicts a pseudo reflection surface A1 being a pseudo water bottom and two pseudo reflection surfaces B2 and C2 under the pseudo water bottom.

The seismic source 11 used to obtain the seismic data shown in the cross-section 40A is located at the depth (water depth) D1 (see FIG. 1). This depth D1 is so deep from the water surface 2 that the influence of a water-surface reflection wave as described later is not negligible. In this case, as shown in FIG. 6A, the receivers 13 receive a reflection wave of the acoustic wave 5 that directly (i.e., without being reflected on the water surface 2) reached the stratum A (B, C) from the seismic source 11. For convenience, this reflection wave is referred to as a direct wave 6. Furthermore, as shown in FIG. 6B, the receivers 13 also receive a reflection wave of the acoustic wave 5 that reached the stratum A (B, C) from the seismic source 11 via a reflection on the water surface 2. In other words, the receiver 13 receives the reflection wave delayed by the time corresponding to a distance twice the depth D1 of the seismic source 11. For convenience, this reflection wave is referred to a water-surface reflection wave 7. As a result, in the cross-section 40A, not only the reflection surfaces A1, B1, and C1 due to the direct waves appear, but also the pseudo reflection surfaces A2, B2, and C2 that are the reflection surfaces due to the water-surface reflection waves appear. That is, the seismic data contains components that represent the same strata but appear at different depths. Therefore, it is necessary to remove the influence of the water-surface reflection waves from the seismic data.

Then, in step S20, a pseudo-water-surface reflection wave is calculated by virtually propagating the direct wave 6 in a progressing direction of a time axis by a time $q_1$ in which the acoustic wave 5 propagates in the water at the distance twice the depth D1 of the seismic source 11, and further correcting an amplitude of the propagated direct wave 6 so that the amplitude is approximated to an amplitude of the water-surface reflection wave 7 of the acoustic wave 5 represented in the seismic data.

The pseudo-water-surface reflection wave is obtained by the following operations, for example. First, a process of propagating a wave field Q of the seismic data downward (i.e., in a progressing direction of the time axis) is performed. For example, by applying the following equation (1) to the wave field Q of the seismic data and propagating the wave field Q downward by $\Delta z=q_i{}^*v$, thereby forming the pseudo-water-surface reflection wave from the direct wave component.

$$\frac{\partial}{\partial z}Q = -\frac{v}{2i\omega}*\frac{\partial^2}{\partial x^2}Q \tag{1}$$

Equation (1) is the 15-degree equation of wave-extrapolation by Claerbout (Claerbout J. F., Imaging the Earth's Interior, Blackwell Scientific Publications, 1985, p. 88), where v is the acoustic velocity in water and ω is the angular frequency.

Next, the water-surface reflection wave component is removed from the seismic data (step S30). Specifically, the component corresponding to the pseudo-water-surface reflection wave obtained in step S20 is subtracted from the seismic data. For example, following the operation exemplarily described above, the seismic data P' having only the component of the direct wave 6 is obtained by subtracting the component of the water-surface reflection wave 7 from the seismic data, based on the following equation (2) including the convolution matrix D' using the pseudo-water-surface reflection wave.

$$p'=d-D'f' \tag{2}$$

where f' denotes a predictive filter for correcting the amplitude of the pseudo-water-surface reflection wave. In the present embodiment, FISTA (Fast Iterative Shrink Thresholding Algorithm) is adopted to optimize the predictive filter f', and the filter f' satisfying LASSO (Least Absolute Shrink and Selection Operator) expressed by equation (3) is obtained.

$$\arg\min_{f'}\{\|d - D'f'\|_2^2 + \lambda\|f'\|_1\} \tag{3}$$

Here, $\|\cdot\|$ n denotes the Ln norm and λ denotes the regularization parameter. By applying the proximity gradient method to equation (3), f' is derived. By performing a calculation by substituting the derived f' into equation (2), it is possible to obtain a cross-section of the seismic data P' having only the component of the direct wave 6 (see FIG. 5C).

FIG. 5B is a cross-section 40B based on the components of the pseudo-water-surface reflection waves. As shown in this figure, by performing the process of step S20 for the seismic data, it is possible to obtain a cross-section corrected by the prediction filter, which shows only the components of the pseudo-water reflection waves. Furthermore, by performing the process of step S30, the components of the cross-section shown in FIG. 5B are subtracted from the components of the cross-section 40A shown in FIG. 5A, and finally a cross-section 40C without the components of the water-surface reflection wave 7 shown in FIG. 5C can be obtained. That as, it is possible to obtain the seismic data in which the influence of the water-surface reflection wave 7 is reduced and the S/N ratio is improved. It should be noted that the operation method is not limited to the wave field extrapolation method described above, but a well-known operation method that can arithmetically simulate the state of the wave field after t seconds can be applied. As well-known operation methods, for example, there are given the 45-degree equation by Claerbout as described above, the Gazda wave field extrapolation method (J. Gazdag, Modeling of the acoustic wave equation with transform methods, Geophysics, Vol. 46(6), pp. 854-859), the time-domain finite difference method (FDTD method) or the finite element method.

The pseudo direct wave may be calculated by: virtually propagating the water-surface reflection wave 7, which is shown in the original seismic data, in a direction opposite to the progressing direction of the time axis by a time $q_1$ in which the acoustic wave 5 propagates in the water at the distance twice the depth D1 of the seismic source 11, and inversing its phase (step S40); and adding the data showing the pseudo direct wave to the seismic data in which the components corresponding to the pseudo-water-surface reflection wave are subtracted (i.e., the seismic data processed in step S30) (step S50).

That is, by the processes of steps S40 and S50, the water-surface reflection wave 7 as utilized as a component showing the cross-section as same as that of the direct wave, instead of treating it as noise to be removed from the seismic data showing the cross-section.

The seismic data from the water-surface reflection wave 7 can be regarded as seismic data from a hypothetical seismic source source 11 in a mirror image location (hereafter referred to as the mirror seismic source 11V) with respect to the water surface 2 (see FIG. 6B). Therefore, seismic data obtained by the mirror seismic source 11V is added to the seismic data acquired from the direct wave 6. In other words, it is possible to obtain the seismic data, which is equivalent to the seismic survey using the actual seismic source 11 and the mirror seismic source 11V, with a single seismic source.

Specifically, the following operations are performed for the processes of steps S40 and S50. The seismic data derived from the water-surface reflection wave 7, that is, the seismic data derived from the mirror seismic source 11V, can be obtained from equation (4) by using the original seismic data d and the seismic data F' having only the component of the direct wave 6 obtained in step S30.

$$R=d-p'$$ (4)

The water-surface reflection wave 7 is delayed by a time $q_1$ than the direct wave 6 (see FIG. 5B). Then, a process of propagating a wave field R of the seismic data from the water-surface reflection wave 7 upward (i.e., in a direction opposite to the progressing direction of the time axis) by a time $q_1$ is performed. In other words, due to a difference in the propagation paths of both acoustic waves, there is a difference between the actual exploration result and the seismic data obtained by the mirror seismic source 11V. A correction resulted from this difference is performed for the water-surface reflection wave 7. In step S20, equation (1) is used to propagate the wave field Q downward. In contrast, in the aforementioned upward propagation process, similar to the aforementioned downward propagation process using equation (1), the wave field R is propagated upward, for example, by using equation (5), to obtain a pseudo direct wave.

$$\frac{\partial}{\partial z}R = -\frac{v}{2i\omega}*\frac{\partial^2}{\partial x^2}R$$ (5)

The seismic data shown by the pseudo direct wave (i.e., corrected water-surface reflection wave 7) can be accurately added to the seismic data shown by the direct wave. However, the upward propagation process is not limited to the operation using equation (1) and can employ various operations which can be applied to the downward propagation process.

As the operational depth of the seismic source 11 is deeper, the mirror seismic source 11V moves upward farther from the water surface 2, and the signal intensity from the mirror seismic source 11V decreases. On the other hand, the signal intensity from the actual seismic source 11 increases.

Figures 7, 8:
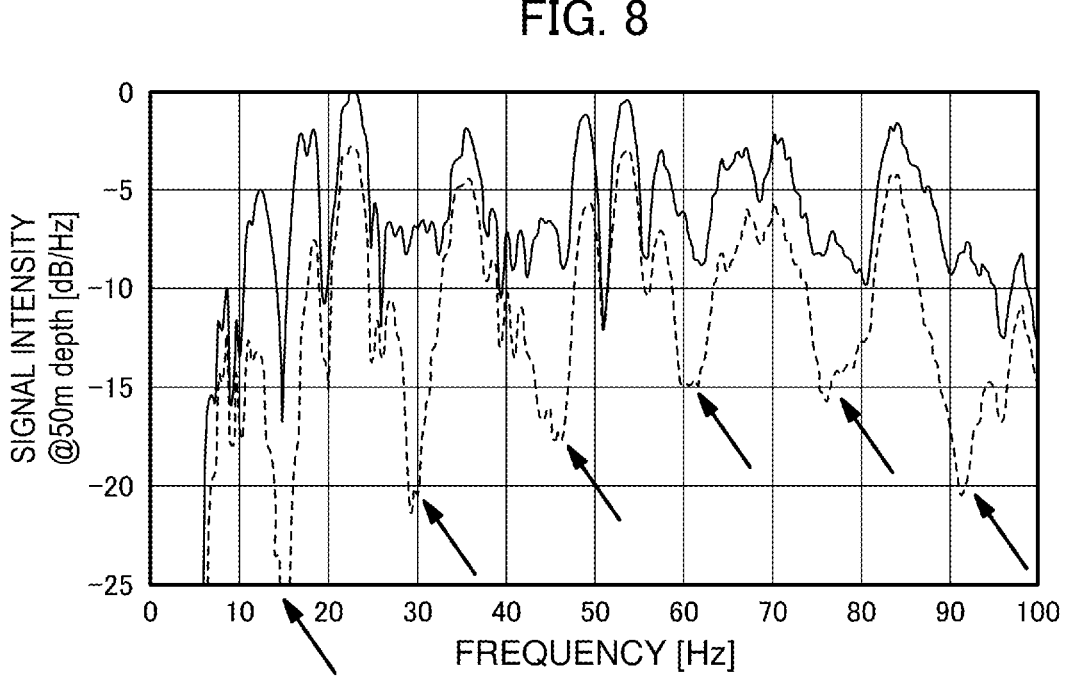
FIG. 7 is a graph showing a relationship between the operation depth (depth) of the seismic source and the signal intensity.
FIG. 8 is a graph showing a frequency spectrum of original seismic data and a frequency spectrum of seismic data acquired by processing the original seismic data according to the present embodiment.

FIG. 7 is a graph showing a relationship between the operational depth (depth) of the seismic source 11 and the signal intensity. The horizontal axis represents the operational depth of the seismic source 11. The vertical axis represents the calculated signal intensity of the acoustic wave generated by the seismic source at a depth of 750 m. The solid line connecting the white circles shows a signal intensity of a reflection wave resulting from the direct wave 6. The dotted line connecting the black circles shows a signal intensity of a reflection wave resulting from the water-surface reflection wave 7. The solid line connecting the black circles shows the sum of these signal intensities.

As understood from FIG. 7, when the operational depth of the seismic source 11 increases, the mirror seismic source 11V becomes farther from the water bottom 3, and thus the signal intensity of the water-surface reflection wave 7, that is, the signal intensity resulting from the mirror seismic source 11V (the dotted line in the figure) is weakened. On the contrary, the signal intensity resulting from the actual seismic source 11 increases as the seismic source 11 is closer to the water bottom 3. As the evidence, FIG. 7 shows that the signal intensity increases as the operational depth of the seismic source 11 increases. Specifically, by the effect of the use of the water-surface reflection wave 7, the signal intensity increases by about 5 dB and 2 dB when the operational depth of the seismic source 11 is 50 m and 225 m, respectively.

When a low-frequency generator equipped with a diaphragm or the like is used as the seismic source 11, the seismic source 11 outputs an acoustic wave with a relatively long output time, such as a sweep wave. Such acoustic wave has a smaller acoustic pressure energy per unit time compared to an impulse wave obtained by an air gun. However, according to the present embodiment, by increasing the operating depth of the seismic source 11, it is possible to obtain a sufficient signal intensity and to improve the S/N ratio of the seismic data, even when a seismic source with a small acoustic pressure energy like the low-frequency generator is used. In this case, the acoustic pressure energy is reduced. Therefore, the negative effects on the marine environment, such as the ecological environment of marine mammals, can also be reduced while reducing the energy consumption of the underwater survey system.

In addition, the phase of the water-surface reflection wave 7 is inverted with respect to that of the direct wave 6. Therefore, the water-surface reflection wave 7 interferes with the direct wave 6 propagating to the bottom 3 and causes a phenomenon (so-called notch) in which a specific frequency component and frequency components of an integral multiple of it are weakened. This tendency is more prominent as the depth of operation of the seismic source 11 becomes deeper. However, according to the present embodiment, the seismic data is separated into the components resulting from the water-surface reflection wave 7 and the components resulting from the direct wave 6. Further, both components are summed with matching their phases. Accordingly, the weakened frequency components by the interference can be recovered.

FIG. 8 is a graph showing a frequency spectrum (dotted line) of original seismic data and a frequency spectrum (solid line) of seismic data obtained by processing the original seismic data according to the present embodiment. The operational depth of the seismic source 11 in this case is 50 m. The arrows in the figure indicate the frequencies at which the effect of the notch described above appears. As shown in the figure, according to the present embodiment, it is possible to eliminate the effect of the notch described above and to improve the S/N ratio of the seismic data.

Second Embodiment

Figure 9:
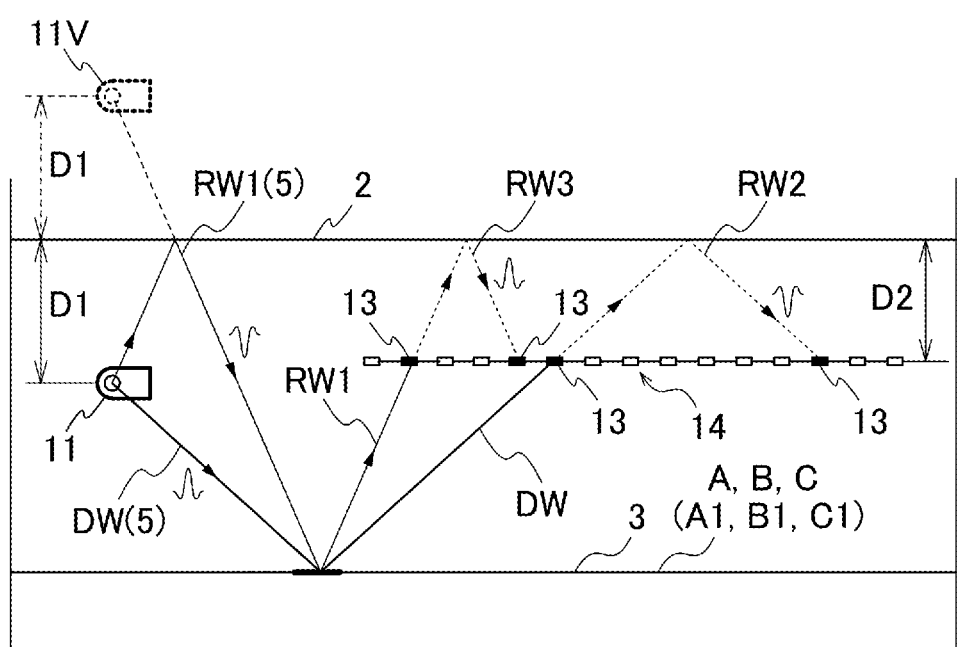
FIG. 9 is a schematic configuration diagram showing an underwater survey system.
Figure 10:
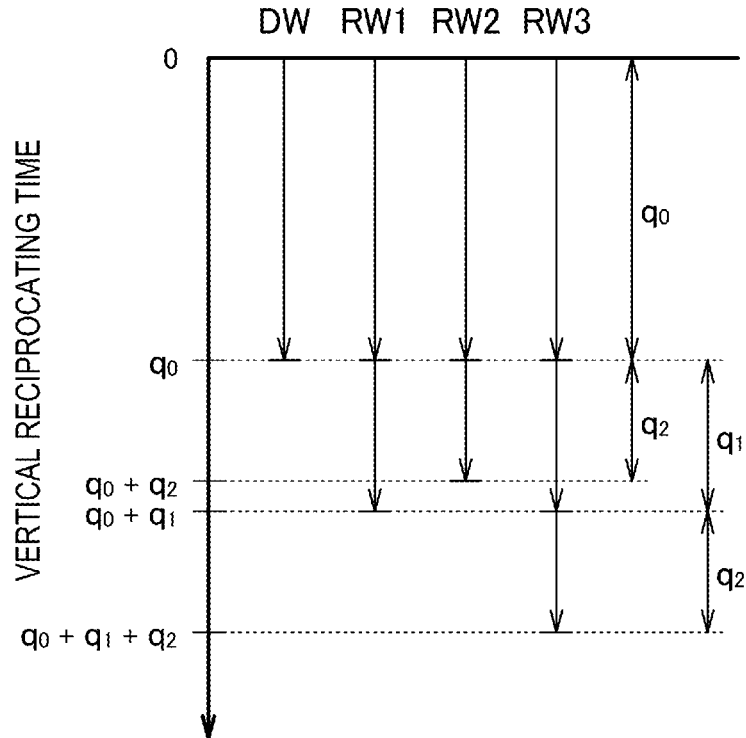
FIG. 10 is a diagram for explaining the change in the reception time of acoustic waves (i.e., converted depth) due to the difference in path length.
Figure 11:
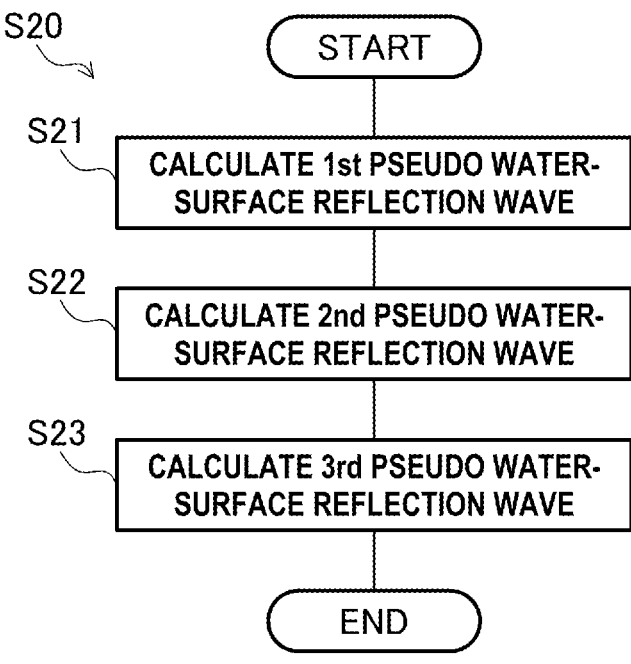
FIG. 11 is a flowchart showing a processing method of the seismic data.
Figure 12:
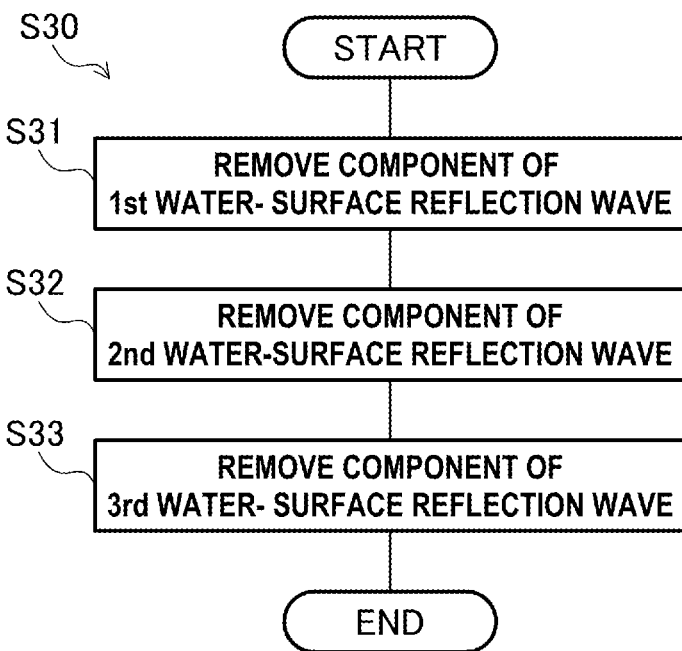
FIG. 12 is a flowchart showing a processing method of the seismic data.

The second embodiment of the present disclosure is described below. In the description of the present disclosure, items that duplicated with those of the first embodiment are denoted by the same reference numerals, and descriptions thereof are omitted. FIG. 9 is a schematic configuration diagram showing an underwater survey system 10 according to the present embodiment. FIG. 10 is a diagram for explaining the change in the reception time of acoustic waves due to the difference in the path length. FIG. 11 and FIG. 12 are flowcharts showing the processing methods of the seismic data.

As shown in FIG. 9, the configuration of the underwater survey system 10 according to the second embodiment is the same as that of the underwater survey system 10 according to the first embodiment.

For convenience of explanation, as shown in FIG. 9, the direct wave 6 described in the description of the first embodiment is referred to as a direct wave DW, and the water-surface reflection wave 7 described in the description of the first embodiment is referred to as a first water-surface reflection wave RW1. As similar to the first embodiment, each receiver 13 receives the direct wave DW (i.e., direct wave 6) and the first water-surface reflection wave RW1 (i.e., water-surface reflection wave 7). As described above, the first water-surface reflection wave RW1 is received with a delay of time $q_1$ corresponding to the distance twice the depth D1 of seismic the source 11.

In the second embodiment, in addition to the direct wave DW and the first water-surface reflection wave RW1, a second water-surface reflection wave RW2 and a third water-surface reflection wave RW3 both reaching the receiver 13 are also used for the arithmetic processing described below. As shown in FIG. 9, the second water-surface reflection wave RW2 is an acoustic wave which propagates as the direct wave DW and is further reflected on the water surface 2. The third water-surface reflection wave RW3 is an acoustic wave which propagates as the water-surface reflection wave RW1 and is further reflected on the water surface 2.

The path length of the second water-surface reflection wave RW2 is longer than that of the direct wave DW. The path length of the third water-surface reflection wave RW3 is longer than that of the second water-surface reflection wave RW2. In other words, acoustic waves deviate from each other in the time axis of the vertical reciprocation.

Therefore, the signal data of the acoustic wave obtained by the receiver 13 independently reveals each component of the second water-surface reflection wave RW2 and the third water-surface reflection wave RW3 as well as each component of the direct wave DW (direct wave 6) and the it water-surface reflection wave RW1 (water-surface reflection wave 7).

For example, as shown in FIG. 10, it is assumed that the direct wave DW appears at a time $q_0$. The first water-surface reflection wave RW1 is the water-surface reflection wave 7 of the first embodiment and is an acoustic wave which is output from the seismic source 11 and reflected on the water surface 2. The first water-surface reflection wave RW1 is delayed by a time $q_1$ relative to the direct wave DW due to the reflection at the reflection surface.

The second water-surface reflection wave RW2 is an acoustic wave which is output from the seismic source 11, reflected on the reflection surface, further reflected on the water surface 2. The second water-surface reflection wave RW2 is delayed by a time $q_2$ corresponding to a distance twice the depth (water depth) D2 of the receiver 13. In other words, the second water-surface reflection wave RW2 is an acoustic wave which propagates once as the direct wave DW and then is reflected on the water surface 2. Therefore, the second water-surface reflection wave RW2 appears a time $q_2$ later than the direct wave DW.

The third water-surface reflection wave RW3 is an acoustic wave which is output from the seismic source 11, reflected on the water surface 2, reflected on the reflection surface, and further reflected on the water surface 2. The third water-surface reflection wave RW3 is delayed by a time $q_1$ corresponding to the distance twice the depth D1 of the seismic source 11 and a time $q_2$ corresponding to a distance twice the depth D2 of the receiver 13. In other words, the third water-surface reflection wave RW3 is an acoustic wave propagating once as the first water-surface reflection wave RW1 and then reflected on the water surface 2. Therefore, the third water-surface reflection wave RW3 appears later than the direct wave DW by the sum of the time $q_1$ and the time $q_2$. The magnitude relationship between the time $q_1$ and the time $q_2$ follows the magnitude relationship between the depth D1 of the seismic source 11 and the depth D2 of the receiver 13.

When the water depth D2 of the receiver 13 has a value such that the receiver 13 can detect four types of acoustic waves, namely the direct wave DW, and the first, second and third water-surface reflection waves RW1, RW2 and RW3, these acoustic waves exhibit the same reflection surface but are received at different times. Therefore, the seismic data contains components that represent the same strata but appear at four different depths. It is necessary to remove the influence of each water-surface reflection wave from the seismic data.

Then, in the present embodiment, the same processes from steps S10 to S30 as in the first embodiment are performed using each water-surface reflection wave (see FIG. 3). Specifically, the seismic data is generated (step S10), and then the arithmetic process of step S20 is performed. In step 320, a pseudo-water-surface reflection wave (hereafter referred to as a first pseudo-water-surface reflection wave) is calculated from the direct wave DW (i.e., direct wave 6) and the first water-surface reflection wave RW1 (i.e., water-surface reflection wave 7) (step 321). Further, a second pseudo-water-surface reflection wave is calculated using the direct wave DW and the second water-surface reflection wave RW2 (step S22). Furthermore, a third pseudo-water-surface reflection wave is calculated using the direct wave DW and the third water-surface reflection wave RW3 (step S23).

For example, when obtaining the first pseudo-water-surface reflection wave, it is calculated by virtually propagating the direct wave DW in the progressing direction of the time axis by a time $q_1$ in which the acoustic wave 5 propagates in the water at the distance twice the depth D1 of the seismic source 11, and further correcting an amplitude of the propagated direct wave so that its amplitude is approximated to an amplitude of the first water-surface reflection wave RW1 of the acoustic wave 5 represented in the seismic data. Here, the first pseudo-water-surface reflection wave is the pseudo-water-surface reflection wave described in the description of the first embodiment. Therefore, it is possible to form the first pseudo-water-surface reflection wave from the component of the direct wave DW by applying the above equation (1) to the wave field Q of the seismic data and propagating it downward by $\Delta z=q_1*v$.

Similarly, when obtaining the second pseudo-water-surface reflection wave, it is calculated by virtually propagating the direct wave DW in the progressing direction of the time axis by a time $q_2$ in which the acoustic wave 5 propagates in the water at a distance twice the distance of the depth D2 of the receiver 13, and correcting an amplitude of the propagated direct wave DW so that the amplitude is approximated to an amplitude of the second water-surface reflection wave RW2 of the acoustic wave 5 represented in the seismic data. Therefore, it is possible to form the second pseudo-water-surface reflection wave formed from the component of the direct wave DW by applying the above equation (1) to the wave field Q of the seismic data and propagating it downward by $\Delta z=q_2*v$.

Similarly, when obtaining the third pseudo-water-surface reflection wave, it is calculated by virtually propagating the direct wave DW in the progressing direction of the time axis by the time $q_2$ in which the acoustic wave 5 propagates in the water at the distance twice the depth D1 of the seismic source 11 and twice the depth D2 of the receiver 13, and correcting an amplitude of the propagated direct wave DW so that the amplitude is approximated to an amplitude of the third water-surface reflection wave RW3 of the acoustic wave 5 represented in the seismic data. Therefore, it is possible to form the third pseudo-water-surface reflection wave from the component of the direct wave DW by applying the above equation (1) to the wave field Q of the seismic data and propagating it downward by $\Delta z=(q_1+q_2)*v$.

Furthermore, as the arithmetic process of step S30, the components corresponding to the first, the second and the third pseudo-water-surface reflection waves are subtracted from the seismic data (steps S31 to S33). For example, following the aforementioned operations exemplarily described, each component of the first, the second and the third water-surface reflection waves RW1, RW2 and RW3 is separated from the seismic data by the above equation (2) with the convolution matrix D' using the first pseudo-water-surface reflection wave, thereby the seismic data P' having only the component of the direct wave DW is obtained.

Figures 13A, 13B:
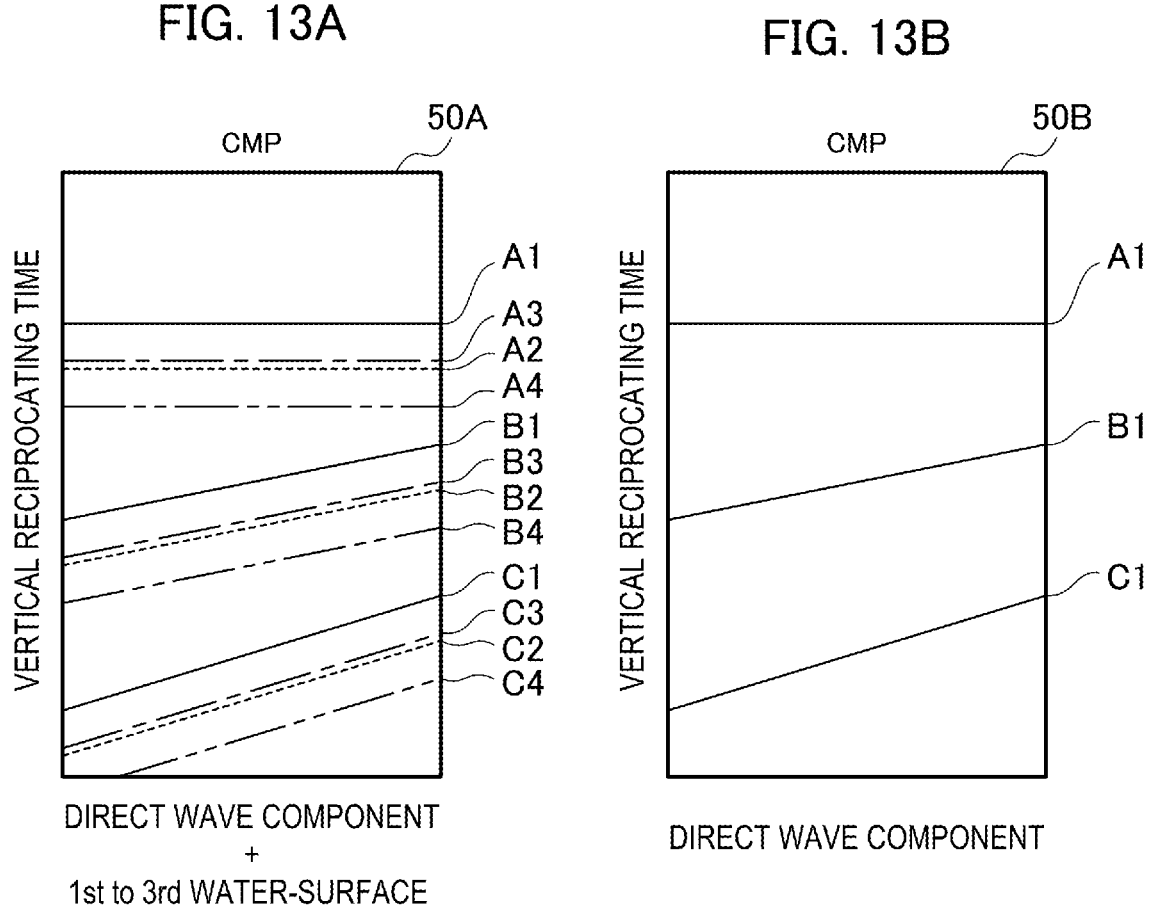
FIGS. 13A and 13B are diagrams for explaining an example of cross-sections acquired from seismic data and its processes.

FIG. 13A are diagrams for explaining an example of the cross-section acquired from the seismic data and its processes. FIG. 13A is a cross-section 50A showing structures under the reflection surface A1 (i.e., water bottom) obtained by the process of step 310. The cross-section 50A shows, as well as the reflection surface A1 being the water bottom, the first, the second and the third pseudo reflection surfaces A2, A3 and AA each of which is the pseudo water bottom. The cross-section 50A also shows, as well as the two reflection surfaces B1 under the water bottom, the first, the second and the third pseudo reflection surfaces B2, B3 and B4 under the pseudo water bottoms. Furthermore, the cross-section 50A shows, as well as the two reflection surfaces C1 under the water bottom, the first, the second and the third pseuds reflection surfaces C2, C3 and C4. The reflection surfaces A1, B1 and C1 are represented due to the direct wave DW. The first pseudo reflection surfaces A2, B2 and C2 are represented due to the first water-surface reflection wave RW1. The second pseudo reflection surfaces A3, B3 and C3 are represented due to the second water-surface reflection wave RW2. The third pseudo reflection surfaces A4, B4 and C4 are represented due to the third water-surface reflection wave RW3.

By performing the processes of steps S20 and S30 on the seismic data, the components of the first to the third pseudo-water-surface reflection waves corrected by the prediction filter are subtracted from the components of the cross-section 50A shown in FIG. 13A. Finally, the cross-section 50B shown in FIG. 13B is obtained without the components of the first, the second, and the third water-surface reflection waves RW1, RW2, and RW3. That is, even if the receiver 13 is placed at the water depth D2 where the influence of the second and third water-surface reflection waves RW2 and RW3 appears, the influence of the first, the second, and the third water-surface reflection waves RW1, RW2 and RW3 is reduced and the seismic data with an improved S/N ratio can be obtained.

In the present embodiment, the receivers 13 (streamer cable 14) may be placed at a depth sufficiently away (deep) from the water surface 2. Generally-used streamer cables have whole lengths from several hundred meters to several kilometers. When such a long streamer cable is towed near the water surface, it is concerned that navigation of ships in a water area surrounding the streamer cable is restricted and the streamer cable itself may be damaged. However, according to the present embodiment, the streamer cable 14 can be placed at a position which is sufficiently deep under the water. Consequently, it is possible to perform the water-bottom exploration while avoiding interference with ships.

Figure 14:
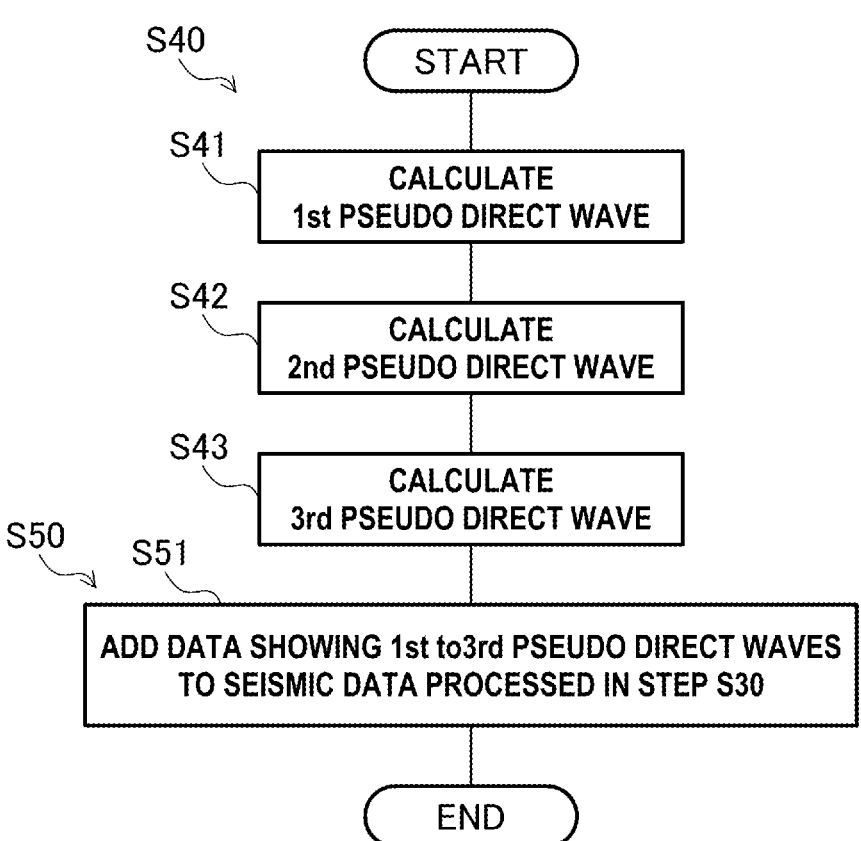
FIG. 14 is a flowchart showing a processing method of the seismic data.

FIG. 14 is a flowchart showing a processing method of the seismic data. Similar to the arithmetic processes of the first embodiment shown in FIG. 4, in the present embodiment, the first, the second, and the third water-surface reflection waves RW1, RW2, and RW3 may be utilized as components showing a cross-section similar to that of the direct wave, instead of treating them as noise to be removed from the seismic data. That is, the processes of steps S41 to S43 are performed as the arithmetic process of step S40, and the process of step S51 is performed as the arithmetic process of step S50.

First, a first pseudo direct wave is calculated by virtually propagating the first water-surface reflection wave RW1 in the direction opposite to the progressing direction of the time axis by the time in which the acoustic wave 5 propagates in the water at the distance twice the depth D1 of the seismic source 11, and inversing its phase (step S41). This is the same as the arithmetic process for the water-surface reflection wave 7 in the first embodiment.

Next, a second pseudo direct wave is calculated by virtually propagating the second water-surface reflection wave RW2 in the direction opposite to the progressing direction of the time axis by the time $q_2$ in which the acoustic wave propagates in the water at the distance twice the depth D2 of the receiver 13, and inversing its phase (step S42). That is, in step S40 of the first embodiment, the water-surface reflection wave 7 is replaced with the second water-surface reflection wave RW2 and the time $q_1$ is replaced with the time $q_2$.

Further, a third pseudo direct wave is calculated by virtually propagating the third water-surface reflection wave RW3 in the direction opposite to the progressing direction of the time axis by the time $q_1$ in which the acoustic wave propagates in the water at the distance twice the depth D1 of the seismic source 11 and the time $q_2$ in which the acoustic wave propagates in the water at the distance twice the depth D2 of the receiver 13 (step S43). That is, in step S40 of the first embodiment, the water-surface reflection wave 7 is replaced with the third water-surface reflection wave PW3 and the time $q_1$ is replaced with the sum of time $q_1$ and time $q_2$. However, since the third water-surface reflection wave RW3 has the same phase as the direct wave DW, the inversion process is not performed unlike the first and second water-surface reflection waves RW1 and RW2.

Thereafter, the data indicating each of the first to third pseudo direct waves is added to the seismic data in which the components corresponding to the first to third pseudo-water-surface reflection waves are subtracted (i.e., the seismic data processed in step S30 (S31 to S33)) (step S51).

By adding the first to third pseudo direct waves, the same effect as that by the first embodiment can be obtained. That is, by increasing the operational depth of the seismic source 11, sufficient signal intensity can be obtained in seismic surveys even if such acoustic pressure energy is small. In addition, the effect of the notch described above can be reduced. Thus, the S/N ratio of the seismic data can be improved.

According to the present disclosure, the suppression of acoustic-pressure energy in water-bottom exploration can be achieved, and it is possible to reduce the negative impact on the marine ecosystem. This can contribute to, for example, Goal 14 "Conserve and sustainably use the oceans, seas, and marine resources for sustainable development." of the United Nations-led Sustainable Development Goals (SDGs).

It should be noted that this disclosure is not limited to above-described embodiment, but is indicated by the statement of the claim, and further includes all changes within the meaning and scope of equality with the statement of the claims.

What is claimed is:

1. A method of processing seismic data by a reflection seismic survey using a seismic source that outputs an acoustic wave into water and a receiver that receives the acoustic wave, the method including:

calculating a first pseudo-water-surface reflection wave by virtually propagating a direct wave represented in the seismic data in a progressing direction of a tip axis by a time in which the acoustic wave propagates in the water at a distance twice a depth of the seismic source, and further correcting an amplitude of the direct wave so that the amplitude is approximated to an amplitude of a water-surface reflection wave of the acoustic wave represented in the seismic data; and subtracting a component corresponding to the first pseudo-water-surface reflection wave from the seismic data;

wherein the direct wave is an acoustic wave output from the seismic source and reflected on a reflection surface without going through reflection on the water surface;

the first water-surface reflection wave is an acoustic wave which is output from the seismic source and reflected on a water surface and further on the reflection surface, thereby being delayed by a time corresponding to a distance twice the depth of the seismic source.

2. The method of processing the seismic data according to claim 1, further including:

calculating a first pseudo direct wave by: virtually propagating the first water-surface reflection wave in a direction opposite to the progressing direction of the time axis by the time in which the acoustic wave propagates in the water at the distance twice the depth of the seismic source, and inversing a phase thereof; and adding data showing the first pseudo direct wave to the seismic data in which components corresponding to the first pseudo-water-surface reflection wave are subtracted.

3. The method of processing the seismic data according to claim 1, further including:

calculating a second pseudo-water-surface reflection wave by virtually propagating the direct wave of the acoustic wave represented in the seismic data in the progressing direction of the time axis by a time in which the acoustic wave propagates in the water at a distance twice a depth of the receiver, and correcting an amplitude of the propagated direct wave so that the amplitude is approximated to an amplitude of a second water-surface reflection wave of the acoustic wave represented in the seismic data;

calculating a third pseudo-water-surface reflection wave by virtually propagating the direct wave in the progressing direction of the time axis by the time in which the acoustic wave propagates in the water at the distance twice the depth of the seismic source and twice the depth of the receiver, and correcting an amplitude of the propagated direct wave so that the amplitude is approximated to an amplitude of a third water-surface reflection wave of the acoustic wave represented in the seismic data; and subtracting components of the second and the third pseudo-water-surface reflection waves from the seismic data;

wherein the second water-surface reflection wave is an acoustic wave which is output from the seismic source, reflected on the reflection surface, and further reflected on the water surface, thereby being delayed by a time corresponding to a distance twice the depth of the receiver, and the third water-surface reflection wave is an acoustic wave which is output from the seismic source, reflected on the water surface, reflected on the reflection surface, and further reflected on the water surface, thereby being delayed by the time corresponding to the distance twice the depth of the seismic source and a time corresponding to the distance twice the depth of the receiver.

4. The method of processing the seismic data according to claim 3, further including:

calculating a first pseudo direct wave by: virtually propagating the first water-surface reflection wave in a direction opposite to the progressing direction of the time axis by the time in which the acoustic wave propagates in the water at the distance twice the depth of the seismic source in which the acoustic wave propagates in the water at the distance twice the depth of the seismic source, and inversing a phase thereof;

calculating a second pseudo direct wave by: virtually propagating the second water-surface reflection wave in a direction opposite to the progressing direction of the time axis by the time in which the acoustic wave propagates in the water at the distance twice the depth of the receiver, and reversing a phase thereof;

calculating a third pseudo direct wave by: virtually propagating the first water-surface reflection wave in a direction opposite to the progressing direction of the time axis by the time in which the acoustic wave propagates in the water at the distance twice the depth of the seismic source and the time in which the acoustic wave propagates in the water at the distance twice the depth of the receiver, and inversing a phase thereof; and adding data representing the first, the second, and the third pseudo direct waves to the seismic data in which components corresponding to the first, the second, and the third pseudo-water-surface reflection wave are subtracted.

\* \* \* \* \*